US006853622B2

(12) United States Patent
Wils et al.

(10) Patent No.: US 6,853,622 B2
(45) Date of Patent: Feb. 8, 2005

(54) LINK AGGREGATION REPEATER PROCESS

(75) Inventors: Joris Johannes Maria Wils, Acton, MA (US); Richard Blanchette, Hopkinton, MA (US); James Scott Hiscock, Rockport, MA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 10/630,960

(22) Filed: Jul. 30, 2003

(65) Prior Publication Data

US 2004/0022185 A1 Feb. 5, 2004

Related U.S. Application Data

(63) Continuation of application No. 09/475,896, filed on Dec. 30, 1999, now Pat. No. 6,621,790.

(51) Int. Cl.[7] ............................. H04L 12/28; H04J 3/08; G01R 31/08
(52) U.S. Cl. ...................... 370/246; 370/400; 370/389; 370/501
(58) Field of Search ................................. 370/228, 248, 370/246, 255, 252, 401, 445, 469, 389, 501, 400; 709/220, 232, 238–239, 252

(56) References Cited

U.S. PATENT DOCUMENTS

| 5,600,637 A | * | 2/1997 | Kikuta ........................ 370/389 |
| 5,740,156 A | * | 4/1998 | Tanabe et al. ............... 370/409 |
| 6,687,751 B1 | * | 2/2004 | Wils et al. .................. 709/230 |
| 6,754,173 B2 | * | 6/2004 | Wils et al. .................. 370/217 |

* cited by examiner

*Primary Examiner*—Duc Ho
(74) *Attorney, Agent, or Firm*—McGlew and Tuttle, P.C.

(57) ABSTRACT

An aggregate link system and process is provided with cooperating link aggregation member devices defining a link aggregation. An connected devices is provided. Network links connect the connected devices to each of the link aggregation member devices. One or more of the network links define an aggregate link. A coordinating system is provided between the link aggregation member devices in the link aggregation of cooperating devices. The coordinating system is defined by the connected devices and the network links. The coordinating system determines a packet type received from the link aggregation. If the packet is one of predetermined packet types, the coordinating system either sends the packet back to the originating link aggregation member device or to the other link aggregation member devices.

20 Claims, 2 Drawing Sheets

LINK AGGREGATION REPEATER PROCESS

This application is a continuation of application Ser. No. 09/475,896 filed on Dec. 30, 1999, now U.S. Pat. No. 6,621,790 the entire disclosure of which is hereby incorporated by reference.

FIELD OF THE INVENTION

The invention relates generally to aggregated switch sets also known as trunk switch clusters, which are connectable to one or more end device (edge devices) with each end device having a physical link to each switch of the switch set and more particularly to groups of switches which together form a single switching entity or single logical local area network (LAN) and which communicate with each other to coordinate communication with connected end devices.

BACKGROUND OF THE INVENTION

In a method referred to as link aggregation, or trunking, a device combines a set of one or more physical links into one logical link, called and aggregate link or trunk. The set of links is connected to another device that also has aggregated those links into an Aggregate Link.

A number of companies have announced plans that allow one or, both ends of the aggregate link to consist of a cluster of one or more cooperating devices. The devices may be for example switches. These cooperating devices are referred herein as cooperating link aggregation member devices, aggregation member devices, cooperating devices or cluster members. The cooperating devices use a separate communication path, the Intra-Cluster Interconnect, to coordinate communication with the connected end devices.

U.S. Pat. No. 6,195,351 discloses a Logical Switch Set (LSS) comprising two or more switches that act as a single packet forwarding device with specific connection rules. The single packet forwarding device is a single logical unit. The LSS may be used as either a redundant switch set (RSS) or as a Load Sharing Switch Set (LSSS). The maximum throughput of the LSSS increases with each additional switch. A LSSS can only interconnect with the other devices via trunked links that contain at least one physical connection to each switch. The RSS may include a trunk link connection and a resilient link connection. U.S. Pat. No. 6,195,351 is hereby incorporated by reference.

U.S. Pat. No. 6,195,349 discloses a packet based high speed mesh which forms a trunk cluster. The trunk cluster is constructed with a set of loosely coupled switches, a configuration protocol, trunked network interfaces, and optionally a reachablilty protocol. The trunk cluster provides a Logical LAN service. Each switch in the trunk cluster provides a single "shared LAN" by interconnecting two or more links. The edge devices attached to the links run a trunk configuration protocol. These attached edge devices view the trunked ports as if trunked ports are connected to a shared LAN with multiple other attached devices. U.S. Pat. No. 6,195,349 is hereby incorporated by reference.

U.S. Pat. No. 6,347,073 discloses a plurality of independent control lines used by I/O modules to determine which switch of a redundant switch set is the active or primary switch. Each line is driven by a different source. Each of these control lines are driven by one of a plurality of judges an each judge can read the other control lines which they are not driving. All the I/O modules can only read the control lines. Each judge makes a decision as to which switch should be the primary switch. Each decision is conveyed using the control lines. The I/O modules use these control lines to direct a multiplexer of the respective outside node to connect to the primary switch. A majority rules algorithm is used to always obtain the correct result in the face of a single error. U.S. Pat. No. 6,347,073 is hereby incorporated by reference.

U.S. Pat. No. 6,058,116 discloses an arrangement of trunk clusters and a method for interconnecting trunk clusters wherein the interconnection method has no single point of failure, the bandwidth between trunk clusters is not limited by the throughput of a single switch, and faults are contained within each trunk cluster. A trunked interconnection structure is provided between trunk clusters. Each switch of a trunk cluster has a logical port connected to a trunked port. The trunked port or trunk port provides a physical connection to each trunk switch of another trunk cluster. Each trunk switch of the another trunk cluster has a logical port connected to a trunked port which in turn has physical connections to each switch of the first trunk cluster. The trunked interconnect isolates faults to a single trunk cluster and there is no single point of failure and the total throughput is not limited to any single switches capacity. This always provides a single loop free path from one trunk cluster to the other or others. Multiple trunk clusters may be interconnected using point-to-point connections. A high throughput campus interconnect trunk cluster can be used to connect each building data center trunk cluster.

With a cluster of devices at the end of an aggregate link, an Intra-Cluster Interconnect (ICI) may be provided to coordinate the switches or cluster devices. However, if only one ICI is provided, some serious problems can occur when the ICI fails. These problems are, but are not limited to:

1. The devices in the cluster often can't determine if the ICI has failed or if devices in the cluster have failed. If the ICI has failed, but the devices are functioning, then the required failure recovery actions are often different, than if one of more of the devices has failed.
2. The overall functioning of the cluster can be degraded. The coordination functions are also used to optimize the throughput, of the cluster. Thus when the ICI is not available throughput is decreased.

SUMMARY AND OBJECTS OF THE INVENTION

It is an object of the invention to provide for up to as many communication paths between the cluster members (aggregation member devices) as there are aggregate links in a trunk switch cluster or aggregated switch set.

It is a further object of the invention to provide for many redundant paths through which the members of the cluster, the cluster devices or switches, can communicate, thereby greatly improving the reliability of the trunk switch cluster or aggregated switch set.

It is a further object of the invention to allow the cluster of devices to use the end device(s) i.e., the devices at the other side of the Aggregate Link to perform all or a critical part of the coordination between the cluster devices.

According to the invention, an aggregate link system is provided with cooperating link aggregation member devices (cluster members) defining a link aggregation. An end device (edge device) is provided. Network links connect the end device to each of the aggregation member devices. One or more of the network links define an aggregate link. A coordinating system is provided for coordination between the devices in the link aggregation of cooperating devices. The coordinating system is defined by the end device and the network links. The coordinating system includes coordinating system features associated with the end device to determine a packet type received from the link aggregation. If the packet is one of predetermined packet types, the coordinating system either sends the packet back to the originating link aggregation member device or to the other link aggregation member devices.

The coordinating system preferably includes a link aggregation repeater process control parser/multiplexer (LARP control parser/multiplexer) connected to the links. The LARP control parser/multiplexer communicates in both directions with a link aggregation sublayer (LAG sublayer). The LAG sublayer maintains a link aggregation database (LAG DB) which stores information as to one of: which of the network links are a member of the aggregate link; and which the aggregate link and any other aggregate link is each network link a member of. A media access controller (MAC) client forms part of the end device. The LAG sublayer communicates in both directions with the MAC client.

The coordinating system further preferably includes a link aggregation repeater process (LAGRP) which reads from the LAG DB and communicates in both directions to the LARP control parser/multiplexer. The LARP control parser/multiplexer tests packets received by the end device to determine the type of packet and directs packets of a coordinating system type to the LAGRP and directs packets of another type to the LAG sublayer for ordinary processing. The LARP control parser/multiplexer forwards packets that are transmitted to the LARP control parser/multiplexer by the LAG sublayer or by the LAGRP to the MAC of the end device unchanged and untested.

According to another aspect of the invention, a process is provided for an aggregate link system. The process includes providing cooperating link aggregation member devices (cluster members) defining a link aggregation (trunk cluster), providing an end device, connecting the end device to each device in the link aggregation by a respective network link, one or more network link defining an aggregate link, and providing a coordinating system for coordinating between the devices in the link aggregation of cooperating devices. The coordinating system is defined by the end device and the network links. The coordinating system includes coordinating system processes steps which take place at the end device. The process steps include determining a packet type received from the link aggregation and if the packet is one of predetermined packet types, the coordinating system either sends the packet back to the originating link aggregation member device or to the other link aggregation member devices.

The coordinating system is preferably provided with a link aggregation repeater process control parser/multiplexer (LARP control parser/multiplexer) connected to each link. Each LARP control parser/multiplexer communicates in both directions with a link aggregation sublayer (LAG sublayer) of the end device. The LAG sublayer is used for maintaining a link aggregation database (LAG DB) which stores information as to the network links that are a member of an aggregate link and the aggregate link and any other aggregate link that each network link is a member of. The coordinating system is provided with a link aggregation repeater process (LAGRP) which reads from the LAG DB and communicates in both directions to the LARP control parser/multiplexer. The LARP control parser/multiplexer is used to test packets received by the end device to determine the type of packet and directing packets of a coordinating system type to the LAGRP and directing packets of another type to the LAG sublayer for ordinary processing.

The system and process of the invention can be used with an ICI connecting cooperating link aggregation member devices. This ICI can be used as the primary coordinating path for the coordinating system. With such an arrangement, the coordinating system can also include the coordinating system part defined by the end device and the network links. The system can go to this as an alternative or backup, in which case the end device provides the repeater function as discussed above. Also, the system of the invention can provide a detection function to determine if the connected end device is capable of providing the repeater function. In this way the system can be used with end devices that are not configured for taking an active part in the coordinating system.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
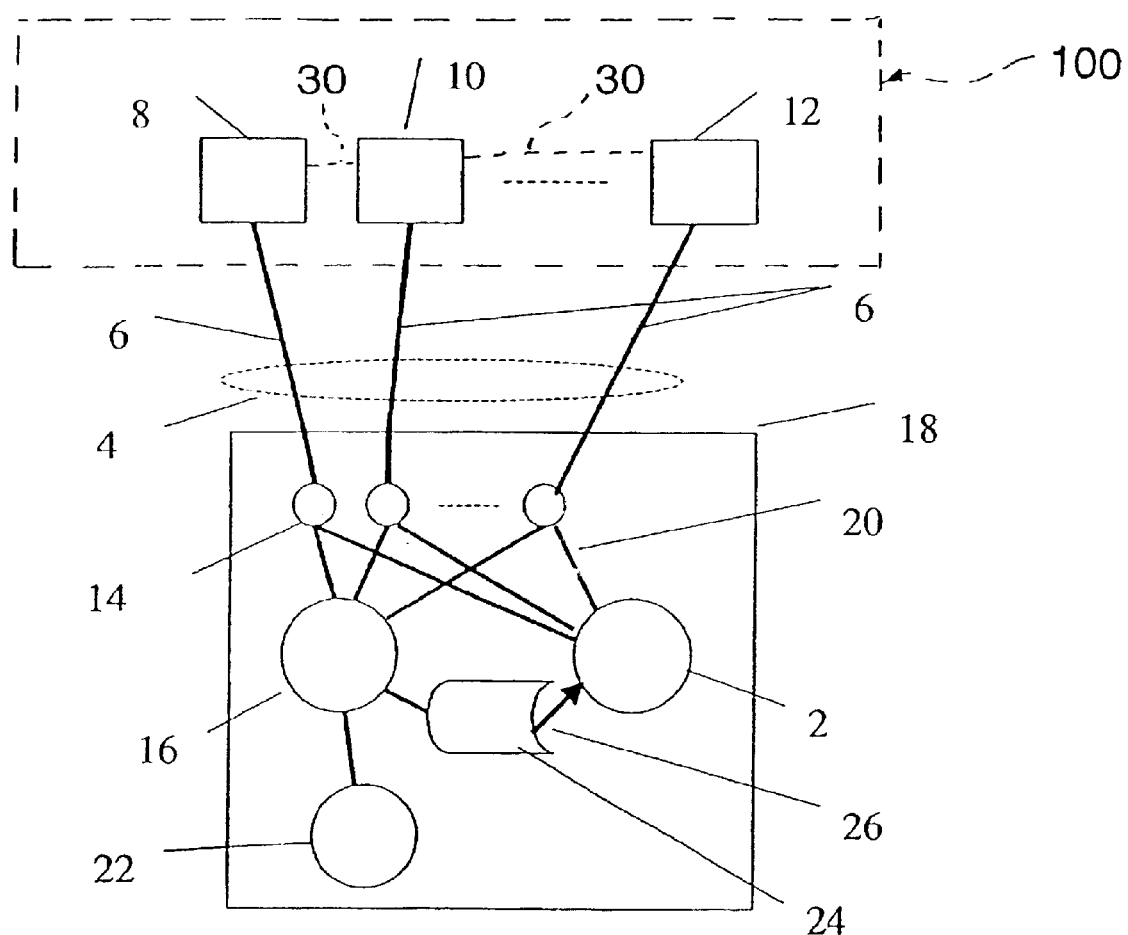
FIG. 1 is a diagram showing the interrelationship between system features according to the invention.

Referring to the drawings in particular, the invention includes a plurality of cooperating link aggregation member devices or cluster members 8, 10 and 12 of a link aggregation or trunk cluster generally designated 100. The cluster members 8, 10, 12 may be switches or similar devices. The showing of three cluster members 8, 10 and 12 is for explanation purposes. The dotted line located in between cluster member 10 and 12 indicates that various other cluster members may be present. The cluster members 8, 10 and 12 may be optionally connected via an intra-cluster interconnect 30. One or more end device 18 is connected to each of the cluster members 8, 10 and 12. The connection is particularly by individual network links 6 which are aggregated into an aggregate link 4.

The network links 6 are each serviced in device 18 by a physical layer, which is not shown, a MAC (media access controller) and optionally a MAC control as specified by the IEEE 802.3 CSMA/CD specification. The connection by the aggregate link 4 allows for communication in both directions with each link and control service interface providing a link aggregation repeater process control parser/multiplexer (LARP control parser/multiplexer) 14. Each LARP control parser multiplexer 14 communicates in both directions with a link aggregation sublayer (LAG sublayer) 16.

As its normal operation, the LAG sublayer 16 maintains a link aggregation database (LAG DB) 24. The LAG DB 24 stores information as to which of the network links 6 are a member of each aggregate link 4. The LAG DB 24 also stores the converse, namely which aggregate link 4 is each network link 6 a member of. If a network link 6 is not aggregated with any other link, the aggregate link 4 is the network link 6 itself.

The LAG sublayer 16 communicates in both directions to MAC Clients 22 in Device 18. The MAC clients 22 are associated with the normal function of the end device 18.

The invention provides a link aggregation repeater process (LAGRP) 2 which reads from the LAG DB 24 via a one directional intra device communication path 26. The link aggregation repeater process (LAGRP) 2 does not write to the LAG DB 24. The LAGRP 2 communicates in both directions to the LARP Control parser/multiplexers 14. The LAGRP 2 runs the pseudo code as follows:

```
Typedef MacAddress Byte[6];
Typedef Ethertype Byte[2];
Constant lagRpEcho = 0, lagRpForward = 1;
Record LagRpPacket {
    MacAddress  macda;
    MacAddress  macsa;
    Ethertype   ethertype;
    Byte    lagRpVersion;
    Byte    lagRpType;
    MacAddress  repeatMacDa;
    Byte    data[];// up to end of packet
        :       // standard trailers
}
LagRepeaterReceivePacket(Packet *packet, Port sourceport)
{
    int *portlist; // pointer to a list of ports in the aggregator
    int  aggregatorId;
    IF   (packet->lagRpType == lagRpEcho)
    THEN
        //Send the packet back to the source indicating that this process is running
        packet->macDa = packet->macSa;
        LagRepeaterTransmitPacket(packet, sourceport)
    ELSE IF (packet->lagRpType == lagRpForward)
        //Determine the Aggregator bound to the sourceport;
        // by doing a lookup in the LAG DB
        aggregatorid = lookupAggregatorInLagDb(sourcePort);
        //Get the list of ports bound to this Aggregator
        //by doing a lookup in the LAG DB
        portlist = lookupPortListInLagDb(aggregatorId);
        //transmit the packet to all ports in the Aggregator
        //except for the source port.
        //Ignore the aggregation state of the port. The port may
        //be offline and not in use by the Aggregator: transmit anyway
        FOR each port in the portlist:
            IF the port is not the sourceport
            THEN
                LagRepeaterTransmitPacket(packet,port)
            ENDIF
        ENDFOR
    ENDIF
}
LagRepeaterTransmitPacket(Packet *packet, Port transmitport)
{
    //send the packet to the destination mac address
    //specified by the originator of the packet
    packet->macda = packet->repeatMacDa;
    //put in the source mac Da of the port that the packet
    //is to be transmitted out of.
    //Get the mac address of the port to go out of from
    //the ports MAC Service interface
    packet->macsa = getPortMacAddress(transmitPort);
    //Send the packet to the multiplexers, which will
    //give it to the MAC.
    TransmitToMac(packet,transmitPort)
}
```

Figure 2:
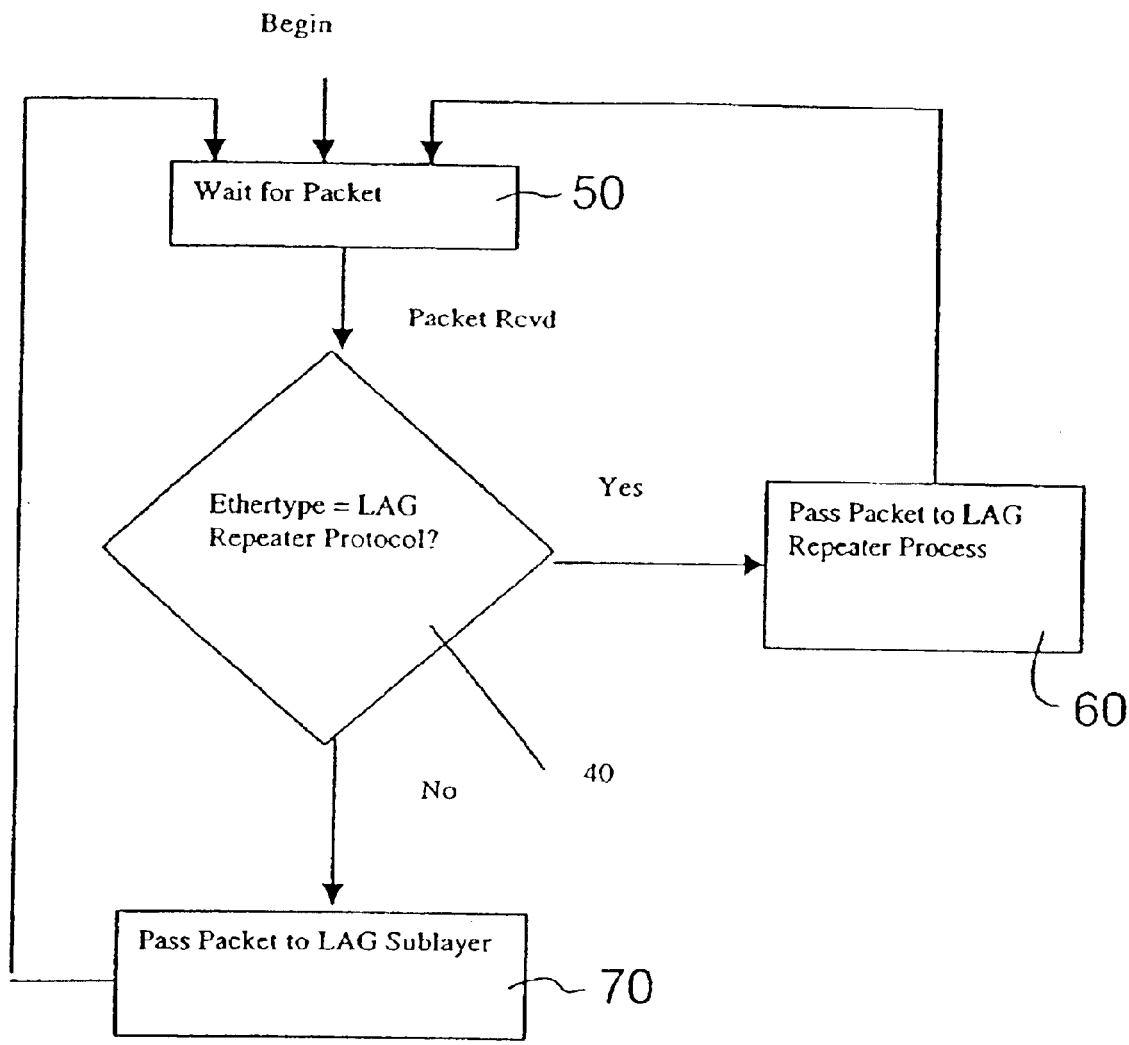
FIG. 2 is a flow chart showing the link aggregation repeater process.

The LARP control parser/multiplexers 14 run the flow chart shown in FIG. 2. The LAG Sublayer 16 includes its control parser/multiplexers and it runs the code that it normally runs.

A packet that a cluster member 8, 10 and 12 wishes to have repeated by the LAGRP 2 must be constructed according to the format of the LagRepeaterRecord shown in the pseudo code above. The LAGRP 2 must:

1. fill the macsa field with a source mac address according to the IEEE 802.1 specification;
2. fill the macda field with the mac address of Device 18's port that is connected to the Network Link 6 that it will transmit the packet on;
3. fill in ethertype field with the to be assigned EtherType value for the LAGRP protocol;
4. fill the lagRpVersion field with the value 1 until the version changes;
5. fill the lagRpType value with the constant "lagRpEcho" or "lagRpForward";
6. fill the repeatMacDa field with the mac address that it wants the LAGRP 2 to put into the macda field when repeating the packet; and
7. fill the rest of the packet with the data that it wishes to transmit to other cluster members 8, 10 and 12.

When a cluster member 8, 10, 12 transmits a packet on a Network Link 6 it is first received by the Physical Layer and the MAC. The Mac hands the packet via the optional Mac-control to the associated LARP Control parser/ multiplexer 14. As shown in FIG. 2 the LARP Control parser/multiplexer 14 tests in step 40 the Ethertype in the packet to see if it equals the LARP Ethertype value. If the test succeeds then the packet is handed to the LAGRP 2. If the test fails, then the packet is handed to the LAG Sublayer 16 for ordinary processing. In the reverse direction: the LARP Control Parsers/Multiplexers 14 forward packets that are transmitted to them by the LAG Sublayer 16 or the LAGRP 2 to the MAC or MAC Control unchanged and untested.

A packet handed to the LAGRP 2 from a LARP control parser/multiplexer is handled in the routine LagRepeaterReceivePacket( ) shown in the pseudo code above. The LagRepeaterReceivePacket( ) routine first tests the lagRpType field in the packet to see what kind of packet it is. If the lagRpType field matches with the constant value "lagRpEcho", then it sends the packet back to the originating Cluster member by calling routine LagRepeaterTransmit-Packet with the sourceport of the packet as the destination port parameter. If the lagRpType field in the packet matches with the constant value "lagRpForward", then the routine LagRepeaterReceivePacket( ) will send the packet to all ports in the Aggregate Link other than the source port. To do this the routine reads LAG DB 24 to get the identification of the Aggregate Link 4 associated with the source Link. Then the routine reads the LAG DB 24 again to get a list of all the network links 6 associated with the source port's aggregate link 4.

The routine LagRepeaterReceivePacket( )shown in the pseudo code above does the following repetitive operation for each network link 6 in the list:

1. test to see if the network link 6 is the source port: if so skip the link and go on to the next one; and
2. call the routine LagRepeaterTransmitPacket( ) with the packet and the network link 6 as a parameter.

The routine LagRepeaterTransmitPacket( ) does the following steps:

1. putting the contents of the repeatMacDa field into the macda field of the packet;
2. filling the macsa field of the packet with the macaddress assigned to the port that the packet is to be transmitted out of; and
3. transmitting the packet out to the network link 6 by transmitting it to the LARP control parser/multiplexer 14 associated with that port, which will transmit it to the MAC, which will transmit it out onto the network link 6. Note that the LARP control parser/multiplexer 14 does transmit to the MAC even if the LAG Sublayer 16 does not yet forward packets from the MAC Clients 22.

As shown in FIG. 2, the process begins and the system waits for a packet at 50. When a cluster member 8, 10 or 12 receives a packet it must test the ethertype field for the LAGRP 2 constant value as shown at 40. If the test matches, then the cluster member 8, 10 or 12 can derive that it can use the data field in the packet to get information from the originating cluster member 8, 10 or 12. FIG. 2 also shows the packet being passed to the LAGRP 2 at 60 or to the LAG sublayer at 70, depending upon the test result at 40.

According to an alternative embodiment of the invention, a registered Ethernet multicast address is used. In the first embodiment, the cluster members 8, 10, 12 must send each LAGRP packet to the MAC address of the port on Device 18 that is connected to the link 6 that the packet is being sent over. An alternative is to put a registered Ethernet multicast address in the macda field of the packet. If that is done the following line can be omitted from the LagRepeaterTransmitPacket( ) routine, which will reduce the compute overhead of that routine:

packet->macda=packet->repeatMacDa;

According to this alternative embodiment, the packets are sent to the MAC address of the partner device's port. In the first embodiment the LagRepeaterTransmitPacket( ) routine transmits each packet to the MAC address specified in the repeatMacDa field of the packet. An alternative is for the routine to send the packet to the MAC address of the port on the cluster member 8, 10 or 12 on the other side of the link. This MAC address can be derived by parsing it from the Link Aggregation Sublayer 16 packets that are being exchanged between the two devices. This approach is useful if the cluster member transmitter of the packet does not know what the MAC address is of the cluster member 8, 10 or 12 that is the receiver of the packet.

This results in the following change to the code in the link aggregation sublayer 16:

```
// Database of the mac addresses of partners
MacAddress partnerMacAddress[numberOfPorts];
LagSubLayerReceivePacket(Packet *packet, Port sourceport)
{
    : standard processing
    //store MAC address of received packet
    partnerMacAddress(sourcePort] = packet->macSa;
    :standard processing
}
LagRepeaterTransmitPacket(Packet *packet, Port transmitport)
{
        : // first embodiment processing
    // Replace
    //    packet->macda = packet->repeatMacDa;
    // with
    packet->macda = partnerMacAddress(transmitPort);
        :// first embodiment processing
}
```

To eliminate the need for the lagRpEcho packet the LagRepeaterProcess can indicate its existence and state (health) in the link aggregation packets that the link aggregation process transmits to support link aggregation. A simple condition value in the link aggregation packets could indicate:

1. is the lag repeater process running?
2. or is it not running?

The cluster members 8, 10 and 12 are then able to inspect the link aggregation packets to see if they need to send the echo packet to see if the LagRepeater function was available.

Also, instead of getting a new Ethertype assigned to support the LagRepeaterProcess the implementor can also use a vendor specific protocol that has as a prefix which is the 3 byte OUI that all vendors of Ethernet products have. This eliminates the administrative delay needed to get an Ethertype assigned.

According to a further embodiment of the invention, aspects of the first and second embodiments can be combined. Particularly, all of the first embodiment and second embodiment may be implemented to make the LAGRP 2 as useful as possible. Each embodiment then has its own value in the lagRpType field in the packet. The LAGRP 2 then parses out the type and determines how to transmit the packet based on that value.

While specific embodiments of the invention have been shown and described in detail to illustrate the application of the principles of the invention, it will be understood that the invention may be embodied otherwise without departing from such principles.

What is claimed is:

1. An aggregate link process comprising the steps of:
 providing cooperating link aggregation member devices defining a link aggregation;
 connecting an end device via network links to each of the respective link aggregation member devices of the link aggregation, the network links defining an aggregate link; and
 coordinating member devices of the link aggregation by repeating packets of predetermined packet type at the end device including receiving a packet from an originating link aggregation member via a network link and repeating the packet by sending the packet back to the originating link aggregation member and/or to the other link aggregation member devices.

2. The aggregate link process according to claim 1, wherein a packet type received from the link aggregation is determined from information in a link aggregation database.

3. The aggregate link process according to claim 2, wherein the step of coordinating includes using a link aggregation repeater process control parser/multiplexer (LARP control parser/multiplexer) connected to the network links, the LARP control parser/multiplexer communicating in both directions with a link aggregation sublayer (LAG sublayer).

4. The aggregate link process according to claim 3, wherein the LAG sublayer maintains the link aggregation database (LAG DB) which stores information as to one of:
 which of the network links are a member of the aggregate link; and
 which aggregate link and any other aggregate link is each network link a member of.

5. The aggregate link process according to claim 3, further comprising:
 providing a media access controller (MAC) client as part of the end device, the LAG sublayer communicating in both directions with the MAC client.

6. The aggregate link process according to claim 3, wherein the step of coordinating comprises reading from the LAG DB and communicating in both directions to the LARP control parser/multiplexer.

7. The aggregate link process according to claim 3, wherein the LARP control parser/multiplexer tests packets received by the end device to determine the type of packet and directs packets of a coordinating system type to the LAGRP and directs packets of another type to the LAG sublayer for ordinary processing.

8. The aggregate link process according to claim 3, wherein the LARP control parser/multiplexer forwards packets that are transmitted to the LARP control parser/multiplexer by the LAG sublayer or by the LAGRP to the MAC of the end device unchanged and untested.

9. A process for an aggregate link process, the process comprising the steps of:
 forming a link aggregation with switches as link aggregation member devices;
 connecting devices to the link aggregation with each device connected via a network link to each member device to provide plural network links between each device and the link aggregation defining an aggregate link;
 coordinating the member devices of the link aggregation by selectively repeating a packet transmission received at one of the connected devices from one link aggregation member device to the other link aggregation member devices to provide coordinating information.

10. The process according to claim 9, wherein selectively repeating a packet transmission includes:
 determining a packet type received from the link aggregation and if the packet is one of predetermined packet types, the coordinating system either sending the packet back to the originating link aggregation member device or to the other link aggregation member devices to provide the repeating;
 providing the coordinating system with a link aggregation repeater process control parser/multiplexer (LARP control parser/multiplexer) connected to each network link, each LARP control parser/multiplexer communicating in both directions with a link aggregation sublayer (LAG sublayer) of the end device;
 using the LAG sublayer for maintaining a link aggregation database (LAG DB) which stores information as to the network links that are a member of an aggregate link and the aggregate link and any other aggregate link that each network link is a member of;
 providing the coordinating system with a link aggregation repeater process (LAGRP) which reads from the LAG DB and communicates in both directions to said LARP control parser/multiplexer; and
 using the LARP control parser/multiplexer to test packets received by the end device to determine the type of packet and directing packets of a coordinating system type to the LAGRP and directing packets of another type to the LAG sublayer for ordinary processing.

11. The process according to claim 10, wherein the LARP control parser/multiplexer forwards packets that are transmitted to the LARP control parser/multiplexer by the LAG sublayer or by the LAGRP to the media access controller (MAC) of the end device unchanged and untested.

12. The process according to claim 10, wherein packets directed to the LAGRP from one of the LARP control parser/multiplexer is handled in a receive packet routine including first testing the packet field to determine what kind of packet it is and if the field matches with a constant value sending the packet back to the originating network link aggregation member by calling a transmit packet routine with a source port of the packet as the destination port parameter and if the field in the packet matches with another constant value, then calling a routine to send the packet to all ports in the aggregate link other than the source port.

13. The process according to claim 12, wherein the routine reads the LAG DB to get the identification of the aggregate link associated with the source link and the routine reads the LAG DB again to get a list of all the network links associated with the source port's aggregate link.

14. The process according to claim 12, wherein the LAGRP takes the step of:
 filling a macsa field with a source MAC address according to the IEEE 802.1 specification;
 filling the macda field with the MAC address of the end device port that is connected to the network link that the packet will be transmitted on;
 filling in an ethertype field with the to be assigned EtherType value for the LAGRP protocol;
 filling in a lagRpVersion field with a value corresponding to the version;
 filling in a lagRpType value with a constant "lagRpEcho" or "lagRpForward";
 filling the repeatMacDa field with the MAC address that the LAGRP wants the LAGRP to put into the macda field when repeating the packet; and filling the rest of the packet with the data that it wishes to transmit to other cluster members.

15. The process according to claim 12, wherein the transmit packet routine, takes the step of:

putting the contents of a repeatMacDa field into a macda field of the packet;

filling the macsa field of the packet with the MAC address assigned to the port that the packet is to be transmitted out of; and transmitting the packet out to the network link by transmitting it to the LARP control parser/multiplexer associated with a port of the end device, which port will transmit the packet to the MAC, which will transmit it out onto the network link, and wherein the receive packet routine, for each network link, takes the step of:

testing to see if the network link is the source port, and if it is skipping the link and going on to the next network link; and call the transmit packet routine with the packet and the network link as a parameter.

16. The process according to claim 12, wherein the transmit packet routine, takes the step of:

putting the MAC address of the port of the link aggregation member device on the other side of the link into a macda field of the packet;

filling the macsa field of the packet with the MAC address assigned to the port that the packet is to be transmitted out of; and transmitting the packet out to the network link by transmitting it to the LARP control parser/multiplexer associated with a port of the end device, which port will transmit the packet to the MAC, which will transmit it out onto the network link and wherein the LAGRP can indicate its existence and state in the link aggregation packets that the link aggregation process transmits to support link aggregation including a simple condition value to indicate:

if the lag repeater process is running; and if the lag repeater process is not running.

17. A aggregate link system comprising:

cooperating link aggregation member devices formed of switches defining a link aggregation;

connected devices with each connected device connected to each link aggregation member by a respective network link with one or more network link defining an aggregate link;

a coordinating means for coordinating the link aggregation member devices, said coordinating means for determining at a connected device a packet type received from the link aggregation and if the packet is one of predetermined packet types either sending the packet back to the originating link aggregation member device or to the other link aggregation member devices.

18. The system according to claim 17, wherein said coordinating means comprises:

a link aggregation repeater process control parser/multiplexer (LARP control parser/multiplexer) connected to each link, each LARP control parser/multiplexer communicating in both directions with a link aggregation sublayer (LAG sublayer) of the connected devices;

a LAG sublayer for maintaining a link aggregation database (LAG DB) which stores information as to the network links that are a member of an aggregate link and the aggregate link and any other aggregate link that each network link is a member of;

a link aggregation repeater process (LAGRP) which reads from the LAG DB and communicates in both directions to said LARP control parser/multiplexer, the LARP control parser/multiplexer testing packets received by the connected devices to determine the type of packet and directing packets of a coordinating system type to the LAGRP and directing packets of another type to the LAG sublayer for ordinary processing.

19. The system according to claim 17, wherein said coordinating means further comprises:

an intra-cluster interconnect connecting said link aggregation member devices;

a detection means for indicating to one of said aggregation member devices the ability for the connected devices to provide coordinating system features; and a repeater means initiated at said connected devices and communicating with the aggregation member devices via said network links, said system using one of said repeater process and said intra-cluster interconnect based on the results of said detection process and the functional state of said intra-cluster interconnect.

20. The system according to claim 19, wherein said coordinating means determines a packet type received from said link aggregation and if the packet is one of predetermined packet types the coordinating system either sends the packet back to the originating link aggregation member device as part of said detection process and/or to the other link aggregation member devices as part of said repeater process.

* * * * *